Feb. 20, 1962 — R. D. RUMSEY — 3,021,822
ROTARY ACTUATOR SEAL
Filed Aug. 28, 1957
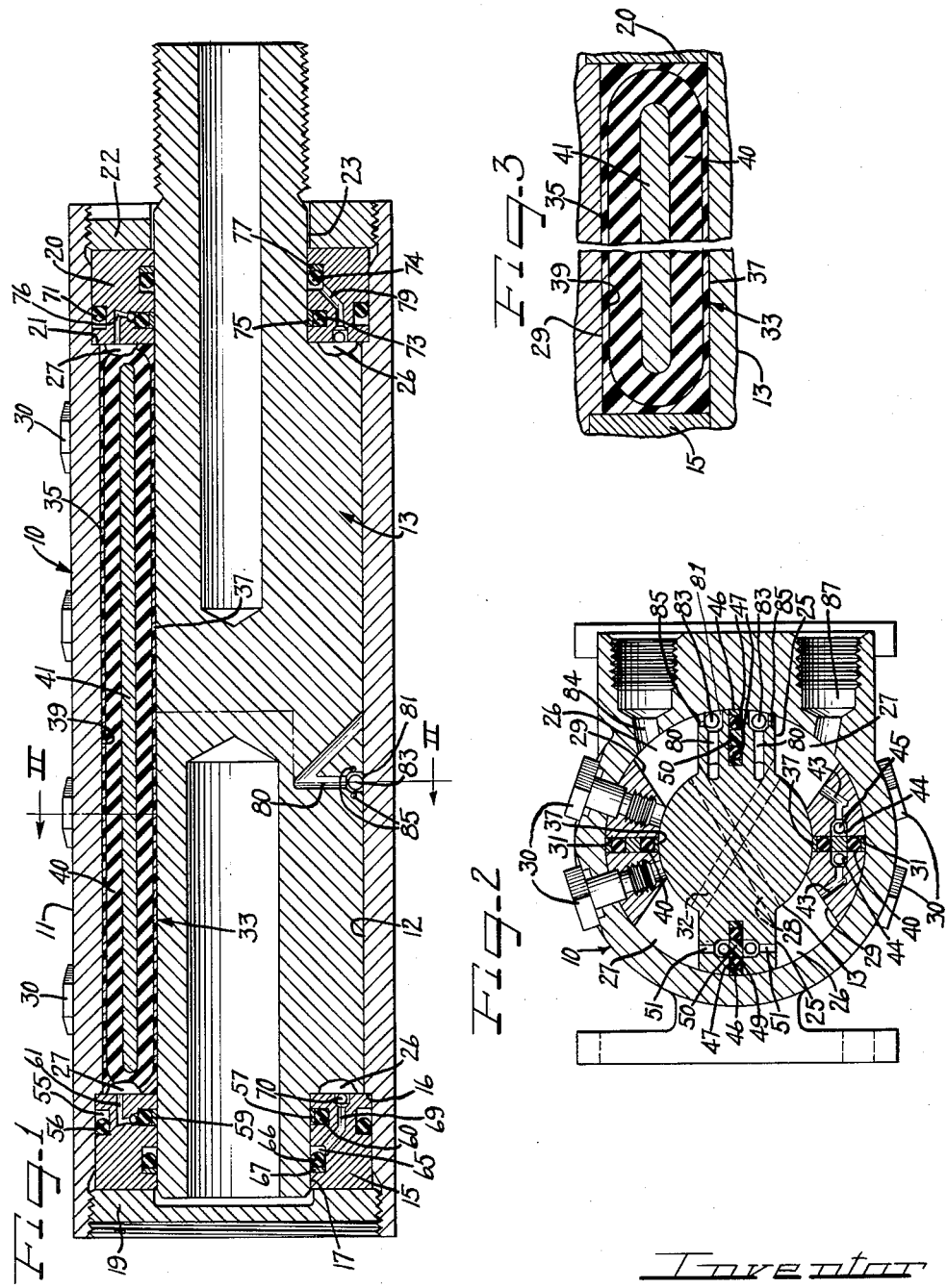
Inventor
Rollin Douglas Rumsey

United States Patent Office 3,021,822
Patented Feb. 20, 1962

3,021,822
ROTARY ACTUATOR SEAL
Rollin Douglas Rumsey, Buffalo, N.Y., assignor to Houdaille Industries, Inc., Buffalo, N.Y., a corporation of Michigan
Filed Aug. 28, 1957, Ser. No. 680,795
3 Claims. (Cl. 121—99)

This invention relates to improvements in sealing devices particularly adapted for fluid pressure rotary actuators, dampers and the like.

A principal object of the invention is to improve upon the seal between two relatively movable parts by pressurizing the sealing means.

A further object of the invention is to provide a sealing means between two relatively movable parts in which the effectiveness of the seal is increased by pressing a relatively flexible sealing surface into sealing engagement with a movable part, by the application of fluid under pressure to an endless sealing member, O-shaped in cross-section.

A still further object of the invention is to provide a new and improved sealing structure particularly adapted for rotary actuators, dampers and the like, in which one part has a slot extending therealong having a hollow sealing member therein opening to opposite sides thereof, and in which a resilient seal O-shaped in cross-section conforms to the hollow interior of the one part and preses the one part into sealing engagement with a movable surface by the application of fluid under pressure to the resilient seal.

A still further object of the invention is to provide a simple and improved form of seal consisting in a sealing member backed up by an O-ring and maintained into effective sealing engagement with the parts to be sealed by the application of fluid under pressure to the O-ring.

These and other objects of the invention will appear from time to time as the following specification proceeds and with reference to the accompanying drawings wherein:

FIGURE 1 is a composite longitudinal sectional view taken through a rotary actuator in which the relatively movable parts are sealed in accordance with the principles of the present invention;

FIGURE 2 is a cross-sectional view of the actuator shown in FIGURE 1 and taken substantially along line II—II of FIGURE 1; and FIGURE 3 is an enlarged fragmentary view showing one of the pressurized seals in section.

In the embodiment of the invention illustrated in the drawings, I have applied the principles of my seal to a hydraulic rotary actuator to seal the relatively movable parts of the actuator with respect to each other. It should be understood, however, that the seal of the invention is equally adaptable to rotary dampers of various types, hydraulic shock absorbers, vaned piston motors and other like devices in which an effective seal is required between relatively movable parts.

As is illustratively shown, more or less diagrammatically in FIGURE 1, reference character 10 designates generally a rotary hydraulic actuator having a housing 11 having a hollow interior cylindrical wall 12 therein defining a chamber, in which is oscillatably mounted a wing shaft or oscillatory piston 13 having slidable engagement with the wall 12, and adapted to be connected with a stationary or movable part of an aircraft, to actuate the movable part of the aircraft upon the admission of fluid under pressure within said chamber.

The housing 11 is shown in FIGURE 1 as being open at each end thereof and as having a sealing member 15 pressed into one end thereof into engagement with a shoulder 16, formed in the inner wall of the housing and forming a bearing and seal for a shaft portion 17 of the rotary piston 13, as will hereinafter more clearly appear as the specification proceeds. An end closure nut 19 is threaded within the open end of the housing 11 to retain the sealing member 15 in place within said housing member.

The opposite end of the housing 11 from the sealing member 15 is closed by a sealing member 20 pressed into engagement with a shoulder 21 in the interior wall 12 of the housing by an end closure nut 22, and sealing a shaft portion 23 of the rotary piston 13 and forming a bearing support therefor, as will hereinafter be more clearly described as this specification proceeds.

The rotary piston 13, commonly called a wing shaft, is provided with a pair of diametrically opposed laterally projecting vanes or wings 25 having slidable engagement with the cylindrical wall 12 and sealed thereto in accordance with the principles of the invention, as will hereinafter be more clearly described as this specification proceeds.

Working chambers 26 and 27 are defined by opposite faces of diametrically opposed fluid reaction abutments 29 and the adjacent faces of the vanes 25. The working chambers 26 are connected together by passageways 28 and leading through the shaft portion of the wing shaft. In a like manner the working chambers 27 are connected together by similar passageways 32.

Each abutment 29 is shown in FIGURE 2 as being in the form of two spaced apart parts, maintained in position by machine screws 30 threaded in said parts from the outside of the housing 11. The abutments 29 extend inwardly from the cylindrical wall 12 into engagement with the shaft portion of the rotary piston 13 between the vanes 25 thereof. The space between said parts forms a slot 31 for a pressurized seal 33 carried therein.

The seal 33 is shown as comprising an outer seal 35 which may be made from molded Teflon, nylon or a like material. As herein shown, the outer seal 35 conforms generally to the form of the slot 31 and has an outer rectilinear face 37 slidably engaging the shaft portion of the rotary piston 13 between the vanes 25 thereof. The sealing member 35 is cut out in its interior portion as indicated by reference character 39 in the general form of an oval, and has a sealing ring 40 recessed therein, which may be in the general form of an elongated O-ring, conforming to the interior portion of the sealing member 35. The O-ring sealing member 40 may be made from rubber or from one of the well known substitutes for rubber, resistant to the chemical action of the hydraulic fluid employed in the actuator. A spacer block or strip 41 is provided within the O-ring member 40, to retain the O-ring sealing member to the form of the interior portion 39 of the seal 35.

As shown in FIGURE 2, fluid passageways 43 lead from opposite faces of the reaction abutment 29 to the slot 31 within the O-ring sealing member 40 to supply fluid under pressure to the O-ring 40 within the confines thereof, and provide an outward force on said O-ring to press the sealing surface 37 of the sealing member 35 into engagement with the shaft portion of the rotary piston 13.

The passageways 43 terminate into check valve chambers 44 opening to the slot 31 and having ball-type check valves 45 therein, to prevent the reverse flow through one passageway 43 as fluid flows through the other passageway 43 from the actuator chamber of the highest pressure, and to thereby provide an outward force on the O-ring 40 equal to the differential in pressure across the two chambers 26 and 27.

The seals for the vanes 25 are similar to the seals for the abutments 29 and comprise molded Teflon or nylon sealing members 46 carried in slots 47 in the vanes 25 and having pressurized O-ring seals 49 extending along the hollow or cut-away interior portion thereof and retained in shape by spacers 50. Check valved passageways 51 are provided to pressurize the O-rings 49 with a force equal to the differential in pressure across the two chambers 26 and 27, and press the seal 46 outwardly into sealing engagement with the wall 12 of the cylindrical actuator chamber.

The sealing member 15 is shown as having an annular groove 55 extending thereabout having O-ring 56 therein, for sealing said sealing member to the inner cylindrical wall of the housing 11. The sealing member 15 also has an annular groove 57 formed therein adjacent the inner end of said sealing member and the wings 25, and having a sealing ring 59 carried therein and engaging the shaft portion 17 of the rotary piston. An O-ring 60 within the groove 57 encircles the annular sealing member 59 and is pressurized by fluid under pressure through check valved passageways 61 having connection with the working chambers 26 and 27 of the damper, to supply fluid under pressure to the O-ring 60 in each direction of rotation of the damper from the chamber of highest pressure. Only one passageway 61 is herein shown, in order to simplify the illustration of the damper. The sealing member 59 like the seal 35 may be made from molded Teflon or nylon, or any other similar material having high wearing and sealing properties, and like the seal 35 is pressed against the shaft portion 17 by the pressure exerted on the O-ring 60 through the passageways 61.

The sealing member 15 also has an axially outwardly spaced groove 65 opening toward the shaft 17 and having an O-ring 66 therein and a nylon or Teflon annular sealing ring 67 extending along the outer wall of the recess 65, adjacent the O-ring 66. The purpose of this seal is to prevent external leakage along the shaft portion 17. A vent passageway 69 leads from the annular passageway 65 back to a working chamber of the actuator, herein shown as being the chamber 26. A check valve 70, is shown as being provided in the passageway 69, to prevent the flow of fluid under pressure from the chamber 26 back to the annular passageway 65.

The sealing member 20 in a like member has an annular seal 71, herein shown as being an O-ring seal engaging the internal wall of the chamber 11 and has spaced series of seals 73 and 74. The seal 73 like the seal 60 is in the form of an O-ring engaging an annular seal 75 and pressing said annular seal into engagement with the shaft portion 23 by fluid under pressure passing from the chamber of highest pressure through a check valved passageway 76. Like the check valved passageways 61, at least two passageways 76 are provided to afford communication with each working chamber 26 and 27, to continuously provide a source of hydraulic pressure from the higher of the two working chambers.

The outer seal 74 is in the form of an O-ring engaging a backup ring 77 and preventing external leakage along the shaft portion 23. The seal 74 is vented back to a working chamber 26 through a check valved passageway 79, like the passageway 69 and check valve 70 therein.

The rotary piston 13 is also shown as having a passageway 80 in a vane 25 thereof having a check valved chamber 81 opening to the cylindrical wall of the damping chamber and having a check valve 83 therein. The passageway 80 leads inwardly from the check valved chamber 81 within the vane 25 and is then inclined outwardly toward the wall of the cylindrical damping chamber and registers with an inlet passageway 84 when the wing shaft 13 is an extreme position, which in FIGURE 2 is shown as being in a counterclockwise direction. The check valve chamber 81 has communication with the damping chamber 26 through ports 85. A passageway 80 and check valve 83 is provided on each side of the seal 35, one check valve chamber being in communication with the working chambers 26, and the other check valve chamber being in communication with the working chambers 27 and a pressure inlet 87.

The purpose of the two passageways 80 and check valves 83 is to prevent locking of the rotary piston near the end of its travel, caused by the fact that when the damper reaches the end of its travel either of the inlet ports 84 or 87 is completely sealed off by the vanes 25 of the rotary piston. This provides a snubbing or damping action at the ends of the strokes of the damper or actuator, and prevents the damper or actuator from damaging itself in the event a full hardover signal is applied with external inertia load. The passageways 80 and check valves 83 thus permit the rotary piston 13 to be moved away from its full travel position at normal speed.

It may be seen from the foregoing that a simple and efficient sealing means has been provided particularly adapted for rotary actuators, dampers or like devices, and that leakage is reduced to a minimum by pressurizing an O-ring seal and thereby forcing an outer seal extending along the O-ring seal into engagement with the movable part to be sealed, by the differential in pressure across the working chambers of increasing and decreasing volume.

It will be understood that various modifications and variations of the present invention may be effected without departing from the spirit and scope of the novel concepts thereof.

I claim as my invention:

1. In a seal for the relatively movable parts of fluid pressure devices having a chamber having an inner cylindrical wall and end walls extending perpendicular thereto, a vane rotatably mounted within said chamber between said end walls for movement along said cylindrical wall and dividing said chamber into opposed working chambers of increasing and decreasing volume, an elongated slot extending along said vane and opening to said cylindrical wall and said end walls, fluid pressure connections leading from opposite sides of said vane into said slot for supplying fluid under pressure thereto in each direction of rotation of said vane and including check valves preventing the backflow of fluid from said slot into said chambers, the improvement comprising unitary sealing means insertable in said slot as a unit, having an elongated spacer block made of a relatively stiff material, a resilient O-ring extending about said spacer block, and a non-metallic seal, stiffer than said O-ring and having a continuous internal wall conforming to the form of said O-ring on said spacer block and extending thereabout and having an outer flat sealing surface extending for the length of said vane and end sealing surfaces perpendicular to said outer sealing surface, said sealing surface having slidable sealing engagement with said cylindrical wall and said end walls, and maintained in sealing engagement therewith by fluid under pressure entering said slot in the spaces between said spacer block and the inner side of said O-ring.

2. In a seal for the relatively movable parts of fluid pressure devices having a chamber having an inner cylindrical wall and end walls extending perpendicular thereto, a vane rotatably mounted within said chamber for movement along said cylindrical wall and dividing said chamber into opposed working chambers of increasing and decreasing volume, an elongated slot extending along said chamber and opening to said cylindrical wall and said end walls, fluid pressure connections leading from opposite sides of said vane into said slot for supplying fluid under pressure thereto in each direction of rotation of said vane and including check valves preventing the backflow of fluid from said slot into said chambers, and sealing means insertable as a unit in said slot for sealing said cylindrical and end walls of said chamber, comprising a relatively rigid spacer block, a resilient O-ring extending about said spacer block and having a cross-sectional diameter substantially equal to the width of said slot, and a plastic seal having a continuous inner wall having parallel spaced elongated wall portions and rounded end walls connecting said rounded wall portions together and conforming to the form of said O-ring on said spacer block, and also having parallel spaced elongated outer wall portions of the length of said vane, and end walls extending perpendicular thereto, the outer of said elongated walls having sealing engagement with said cylindrical chamber and extending for the length thereof and said end walls having sealing engagement with the end of said chamber, and said plastic seal being maintained in sealing engagement with said cylindrical wall and said end walls by fluid under pressure entering said slot through said fluid pressure connections into the spaces between said spacer block and said O-ring seal.

3. A unitary seal particularly adapted to seal a sliding vane to the cylindrical and perpendicular end walls of a fluid pressure chamber in which the sliding vane has a slot extending therealong opening to the cylindrical and end wall of the chamber, comprising an elongated spacer block made from a relatively rigid material, a continuous elongated O-ring extending about said spacer block and having parallel sides extending along said spacer block and rounded end portions connecting said sides together, and a thermoplastic seal having a continuous interior wall extending about said O-ring and having curved end walls conforming to the curvature of the end walls of said O-ring, said thermoplastic seal also having parallel spaced outer walls extending for the length of said vane and chamber and end walls extending perpendicular thereto and providing rectangular corners at the ends of said seal, said spacer block, O-ring and thermoplastic seal forming a unitary seal insertable in the slot of the sliding vane as a unit.

References Cited in the file of this patent

UNITED STATES PATENTS

| | | |
|---|---|---|
| Re. 24,440 | Groen | Mar. 4, 1958 |
| 2,349,170 | Jackman | May 16, 1944 |
| 2,372,710 | Chisholm | Apr. 3, 1945 |
| 2,509,672 | Christensen | May 30, 1950 |
| 2,520,306 | Detweiler | Aug. 29, 1950 |
| 2,798,462 | Ludwig | July 9, 1957 |
| 2,806,451 | Vinkler et al. | Sept. 17, 1957 |
| 2,870,748 | Hemphill | Jan. 27, 1959 |
| 2,892,645 | Tydeman | Jan. 30, 1959 |

FOREIGN PATENTS

| | | |
|---|---|---|
| 520,237 | Great Britain | Apr. 18, 1940 |

UNITED STATES PATENT OFFICE
CERTIFICATE OF CORRECTION

Patent No. 3,021,822　　　　　　　　　　　　February 20, 1962

Rollin Douglas Rumsey

It is hereby certified that error appears in the above numbered patent requiring correction and that the said Letters Patent should read as corrected below.

Column 4, line 63, for "chamber" read -- vane --; column 5, line 1, for "rounded" read -- elongated --.

Signed and sealed this 10th day of September 1963.

(SEAL)
Attest:

ERNEST W. SWIDER
Attesting Officer

DAVID L. LADD
Commissioner of Patents